(12) United States Patent
Pogue et al.

(10) Patent No.: US 11,547,220 B1
(45) Date of Patent: Jan. 10, 2023

(54) BABY HIGH CHAIR LINER SYSTEM (71) Applicants: Kacie Pogue, Hugo, OK (US); Tyler Pogue, Hugo, OK (US)

(72) Inventors: Kacie Pogue, Hugo, OK (US); Tyler Pogue, Hugo, OK (US)

(*) Notice: Subject to any disclaimer, the term of this patent is extended or adjusted under 35 U.S.C. 154(b) by 19 days.

(21) Appl. No.: 17/184,648

(22) Filed: Feb. 25, 2021

Related U.S. Application Data (60) Provisional application No. 62/981,095, filed on Feb. 25, 2020.

(51) Int. Cl.
A47D 15/00 (2006.01)
B62B 3/14 (2006.01)

(52) U.S. Cl.
CPC ............ A47D 15/00 (2013.01); B62B 3/1444 (2013.01); B62B 3/1448 (2013.01)

(58) Field of Classification Search
CPC ..... B62B 3/1444; B62B 3/1448; A47D 15/00; B60N 2/2881
USPC ........................................ 297/219.12, 256.17
See application file for complete search history.

(56) References Cited

U.S. PATENT DOCUMENTS

| 3,578,380 | A | * | 5/1971 | Jacobus | B62B 3/144 |
| | | | | | 297/229 |
| 4,568,125 | A | * | 2/1986 | Sckolnik | A47D 1/103 |
| | | | | | 297/229 |
| 4,655,502 | A | * | 4/1987 | Houllis | B62B 3/144 |
| | | | | | 297/229 |
| 5,238,293 | A | * | 8/1993 | Gibson | B62B 3/144 |
| | | | | | 297/229 |
| 5,678,888 | A | * | 10/1997 | Sowell | B62B 3/144 |
| | | | | | 297/219.12 X |
| 5,791,732 | A | * | 8/1998 | Lucree | B62B 3/144 |
| | | | | | 297/219.12 X |
| 5,897,165 | A | * | 4/1999 | Kucharczyk | B62B 3/144 |
| | | | | | 297/219.12 |
| 5,918,933 | A | * | 7/1999 | Hutchinson | A47C 7/383 |
| | | | | | 297/219.12 X |
| 5,967,606 | A | * | 10/1999 | Bergh | B62B 3/144 |
| | | | | | 297/219.12 |
| 6,036,264 | A | * | 3/2000 | Lucree | B62B 3/144 |
| | | | | | 297/219.12 X |
| 6,129,417 | A | * | 10/2000 | Cohen-Fyffe | B62B 3/144 |
| | | | | | 297/219.12 |
| 6,129,418 | A | * | 10/2000 | Bergh | B62B 3/144 |
| | | | | | 297/219.12 |

(Continued)

Primary Examiner — Rodney B White
(74) Attorney, Agent, or Firm — Ashkan Najafi (57) ABSTRACT A baby high chair liner includes a single and unitary body including a plurality of panels integrally and monolithically coupled to each other, a plurality of fold over tabs integrally and monolithically coupled to the panels respectively, a plurality of lines of weakness disposed at associated conjoining edges of the panels and the fold over tabs such that the fold over tabs are freely pivotally about the lines of weakness, respectively, and a plurality of fasteners connected to the fold over panels, respectively. The fasteners are configured to detachably secure the fold over panels to the existing baby high chair. The panels and the fold over tabs are configured to secure and cover a major seat surface area of an existing baby high chair and thereby provide a protective barrier between a child and the existing baby high chair.

15 Claims, 4 Drawing Sheets

(56) References Cited

U.S. PATENT DOCUMENTS

| | | | |
|---|---|---|---|
| 6,237,998 B1* | 5/2001 | Aprile | B62B 5/0013 297/219.12 |
| 6,428,098 B1* | 8/2002 | Allbaugh | A47D 1/00 297/219.12 |
| 6,517,155 B1* | 2/2003 | Landine | B62B 3/144 297/256.17 X |
| 6,631,950 B1 | 10/2003 | Madole | |
| 6,676,210 B1* | 1/2004 | Peyton | A47C 31/11 297/219.12 X |
| 6,817,663 B1* | 11/2004 | Stuart | A47C 31/11 297/219.12 X |
| 6,848,743 B1* | 2/2005 | Collins | B62B 3/144 297/219.12 X |
| 6,851,749 B2* | 2/2005 | Norman | A47D 1/10 297/219.12 X |
| 6,929,326 B2* | 8/2005 | Cohen-Fyffe | A47C 31/11 297/219.12 |
| 7,367,621 B1* | 5/2008 | Han-Dressor | B62B 3/144 297/219.12 |
| 8,042,869 B2* | 10/2011 | McClintock | B62B 3/1448 297/219.12 X |
| 8,382,201 B2* | 2/2013 | Mills | B62B 5/0013 297/219.12 |
| 8,770,663 B2* | 7/2014 | Zack | B62B 3/1448 297/219.12 X |
| 8,857,905 B1* | 10/2014 | Pusateri | B62B 3/1448 297/219.12 |
| 9,622,591 B2 | 4/2017 | Lipson | |
| 2003/0227202 A1* | 12/2003 | Endicott | B62B 3/1456 297/219.12 |
| 2006/0103201 A1* | 5/2006 | Lundgren | B62B 3/144 297/256.17 |
| 2006/0119153 A1* | 6/2006 | Feist | B62B 3/144 297/256.17 |
| 2008/0084099 A1* | 4/2008 | Palgon | A47D 15/006 297/219.12 |
| 2008/0211280 A1* | 9/2008 | Reynolds | B62B 3/144 297/256.17 |
| 2008/0258528 A1* | 10/2008 | Bush | B62B 3/1456 297/256.17 |
| 2010/0065172 A1 | 3/2010 | Dus | |
| 2010/0109399 A1 | 5/2010 | Rockwell et al. | |
| 2011/0012404 A1* | 1/2011 | Cariera | B60N 2/6036 297/219.12 X |
| 2020/0031379 A1* | 1/2020 | Liao | B62B 3/1448 |

* cited by examiner

BABY HIGH CHAIR LINER SYSTEM

CROSS REFERENCE TO RELATED APPLICATIONS

This is a non-provisional patent application that claims priority to and the benefit of U.S. provisional patent application No. 62/981,095 filed Feb. 25, 2020, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to protective liners and, more particularly, to a protective liner for a high chair.

Prior Art

When families with infants and toddlers visit restaurants for dining, it is often desirable to have devices like high chairs, booster chairs or infant seats for babies. When such devices are in use, parents feel free since the small children are secured and a stay in one place when the family is having food. However, generally, these devices are not washed or disinfected regularly between uses. Although restaurants and other food service facilities take some measures to clean the high chair, it is challenging to keep it hygienic before each use, because of the repeated and frequent use of these devices. Thus, it is desirable to cover the chair in such a way that any portion of it will not come into contact with the child. This will put the parents' mind at ease. A suitable solution is desired.

Various attempts have been made to solve problems found in protective liner for a high chair art. Among these are found in: U.S. Patent and Publication Nos. 2010/0065172; 2010/0109399; U.S. Pat. Nos. 6,631,950; and 9,622,591. This prior art is representative of protective liners for high chairs.

Accordingly, a need remains for a protective liner for a high chair in order to overcome at least one aforementioned shortcoming. The exemplary embodiment(s) satisfy such a need by providing a protective liner for a high chair that is convenient and easy to use, lightweight yet durable in design, versatile in its applications, and designed for being folded during transport.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a protective liner for a high chair. These and other objects, features, and advantages of the non-limiting exemplary embodiment(s) are provided by a baby high chair liner for use with an existing baby high chair. The baby high chair liner includes a single and unitary body including a plurality of panels integrally and monolithically coupled to each other, a plurality of fold over tabs integrally and monolithically coupled to the panels respectively, a plurality of lines of weakness disposed at associated conjoining edges of the panels and the fold over tabs such that the fold over tabs are freely pivotally about the lines of weakness, respectively, and a plurality of fasteners connected to the fold over panels, respectively. Advantageously, the fasteners are configured to detachably secure the fold over panels to the existing baby high chair. Advantageously, the panels and the fold over tabs are configured to secure and cover a major seat surface area of an existing baby high chair and thereby provide a protective barrier between a child and the existing baby high chair. Advantageously, the single and unitary body is configured to contour an inner portion of the existing baby high chair when installed on the high chair. Advantageously, the panels and the fold over tabs each are flexible and include disposable material.

In a non-limiting exemplary embodiment, the panels include a central panel, a front panel flexibly and integrally attached to the central panel, a rear panel flexibly and integrally attached to the central panel and oppositely seated from the front panel, the rear panel having a tapered shape converging away from the central panel, a right side panel flexibly and integrally attached to the central panel, the right side panel having a tapered shape diverging away from the central panel, and a left side panel flexibly and integrally attached to the central panel and oppositely seated from the right side panel, the left side panel having a tapered shape diverging away from the central panel.

In a non-limiting exemplary embodiment, the fold over tabs includes a front fold over tab flexibly and integrally attached to the front panel wherein the front fold over tab is bifurcated into a first fold over tab section and a second fold over tab section. The fold over tabs further include a rear fold over tab flexibly and integrally attached to the rear panel, a right side fold over primary tab flexibly and integrally attached to the right side panel, a right side fold over auxiliary tab flexibly and integrally attached to the right side panel and registered at a right angle to the right side fold over primary tab, a left side fold over primary tab flexibly and integrally attached to the left side panel, and a left side fold over auxiliary tab flexibly and integrally attached to the left side panel and registered at a right angle to the left side fold over primary tab.

In a non-limiting exemplary embodiment, the left side fold over auxiliary tab and the right side fold over auxiliary tab each have a surface area less than an associated surface area of the left side fold over primary tab and the right side fold over primary tab, respectively.

In a non-limiting exemplary embodiment, the left side fold over auxiliary tab and the right side fold over auxiliary tab extend forwardly relative to the left side fold over primary tab and the right side fold over primary tab, respectively.

In a non-limiting exemplary embodiment, selected ones of the fold over tabs are configured to secure the single and unitary body to arm portions, a back portion, and front safety bars of the existing baby high chair.

In a non-limiting exemplary embodiment, the single and unitary body further includes a plurality of apertures juxtaposed side-by-side at the front panel and are configured to removably receive infant legs therethrough while seated in the existing baby high chair.

In a non-limiting exemplary embodiment, the single and unitary body is flexible and includes a unmorphed first shape having an unfolded planar configuration, a morphed second shape having a partially unfolded configuration, a morphed third shape having a partially folded and in-use configuration to cover the existing baby high chair, and a morphed fourth shape having a folded planar and non-use configuration to transport the baby high chair liner. Advantageously, the baby high chair liner further includes a transport carrier configured to received and house the single and unitary body when folded to the morphed fourth shape.

In a non-limiting exemplary embodiment, the fasteners include at least one of a hook-and-loop fastener and an adhesive tape.

The present disclosure further includes a method of using a baby high chair liner with an existing baby high chair. Such a method includes the steps of: providing an existing baby high chair; and providing a baby high chair liner having a single and unitary body. Such a baby high chair liner has a plurality of panels integrally and monolithically coupled to each other, a plurality of fold over tabs integrally and monolithically coupled to the panels respectively, a plurality of lines of weakness disposed at associated conjoining edges of the panels and the fold over tabs such that the fold over tabs are freely pivotally about the lines of weakness, respectively, and a plurality of fasteners connected to the fold over panels, respectively, wherein the panels and the fold over tabs each are flexible and include disposable material.

The method further includes the steps of: the fasteners detachably securing the fold over panels to the existing baby high chair; the panels and the fold over tabs securing and covering a major seat surface area of an existing baby high chair and thereby providing a protective barrier between a child and the existing baby high chair; and the single and unitary body contouring an inner portion of the existing baby high chair when installed on the high chair.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

The non-limiting exemplary embodiment(s) is/are referred to generally in FIGS. 1-4 and is/are intended to provide a disposable product meant for keeping baby high chairs 11 clean and protecting babies from prior grime, bacteria, etc. It comes folded in an easy to carry package (carrier) 12. Once at a location such as a restaurant, it is unfolded, laid into the high chair 11 and the tabs 15 are wrapped around the wooden arms, back and front restraining bar. The tabs 15 have tape or VELCRO® that keeps them attached. The baby is then put into the chair through the top and the legs go into precut apertures 20 in the liner 10. The liner 10 also protects the high chair strap in the front that is connected to the restrainer bar from grime as well. Available liners 10 are large, unwieldy and get dirty easily. Several of this liners 11 can be carried in the carrier 12. The liners 12 may be one-time use and disposable or configured to be washed and reused several times.

In a non-limiting exemplary embodiment of the present disclosure, baby high chair liner 10 may comprise a portable hygienic cover for public high chairs such as those found in restaurants.

Figure 1:
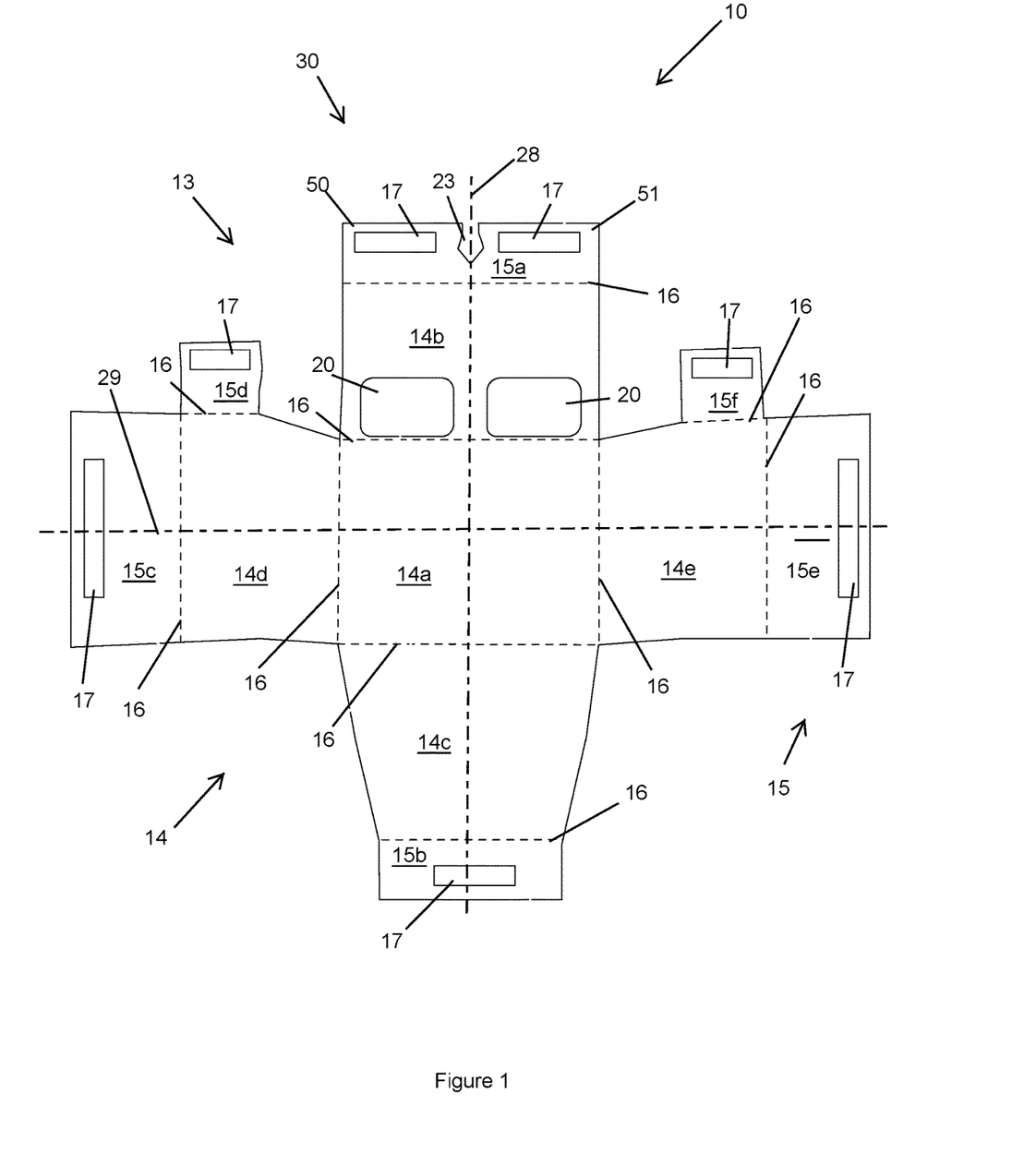
FIG. 1 is a bottom plan view illustrating a baby high chair liner disposed at an unfolded planar configuration, according to a non-limiting exemplary embodiment of the present disclosure.

In a non-limiting exemplary embodiment of the present disclosure, there is shown in FIG. 1 a top planar view of a baby high chair liner 10 during an unfolded condition. The baby high chair liner 10 includes a foldable hygienic liner 10 for baby high chairs 11 having a series of panels 14 configured to be placed within and cover a significant portion of the high chair 11 to provide a protective barrier between a child and the high chair 11. The baby high chair liner 10 is structured and sized to contour the inner portion of the high chair 11 when installed within the high chair 11. The foldable hygienic liner 10 provides a solution for covering public high chairs 11 and protecting babies from germs. In some embodiments, a significant portion is any portion that the child can reach when using the high chair 11 as intended.

Figure 2:
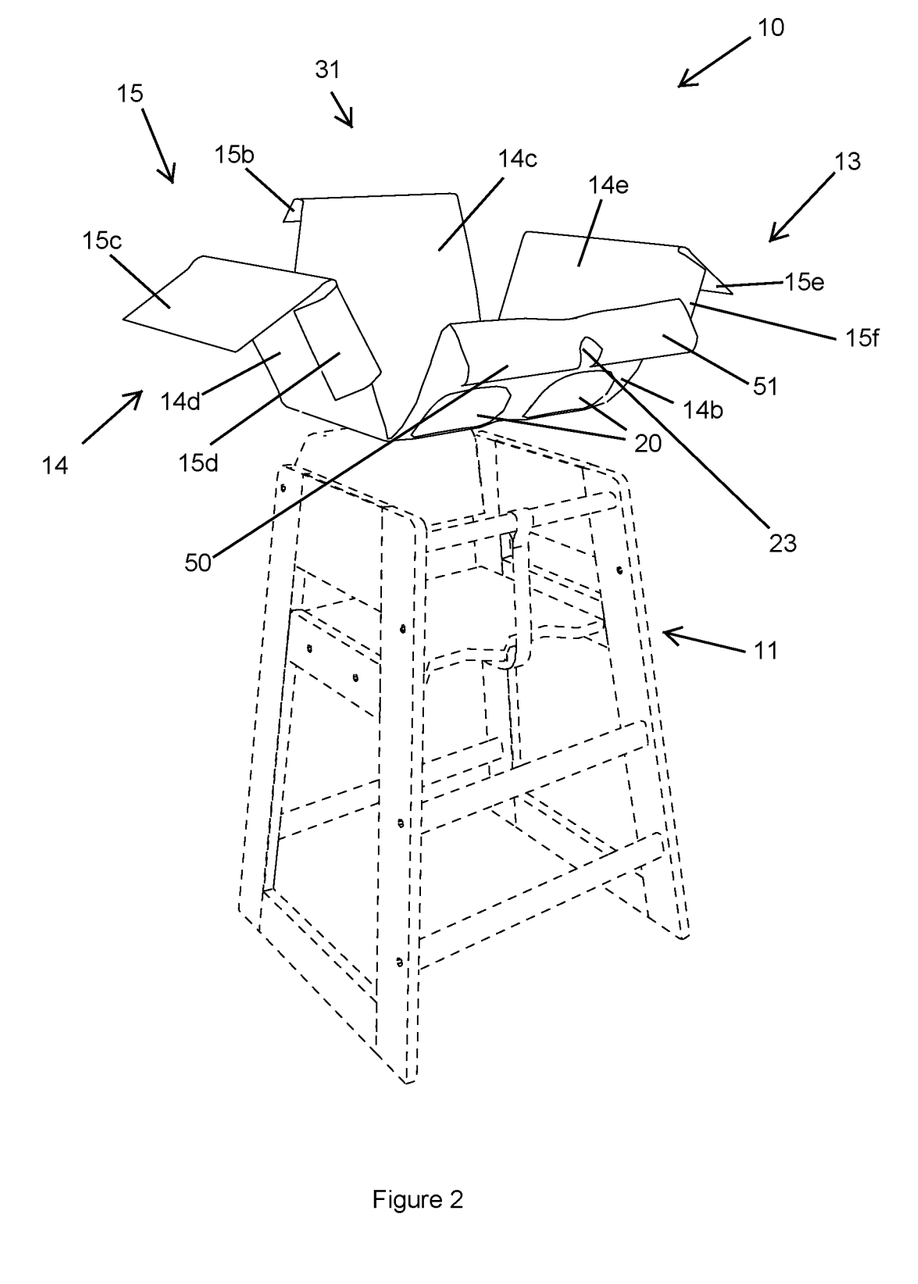
FIG. 2 is a perspective view illustrating a partially unfolded configuration of the baby high chair liner shown in FIG. 1, wherein according to a non-limiting exemplary embodiment of the present disclosure.
Figure 3:
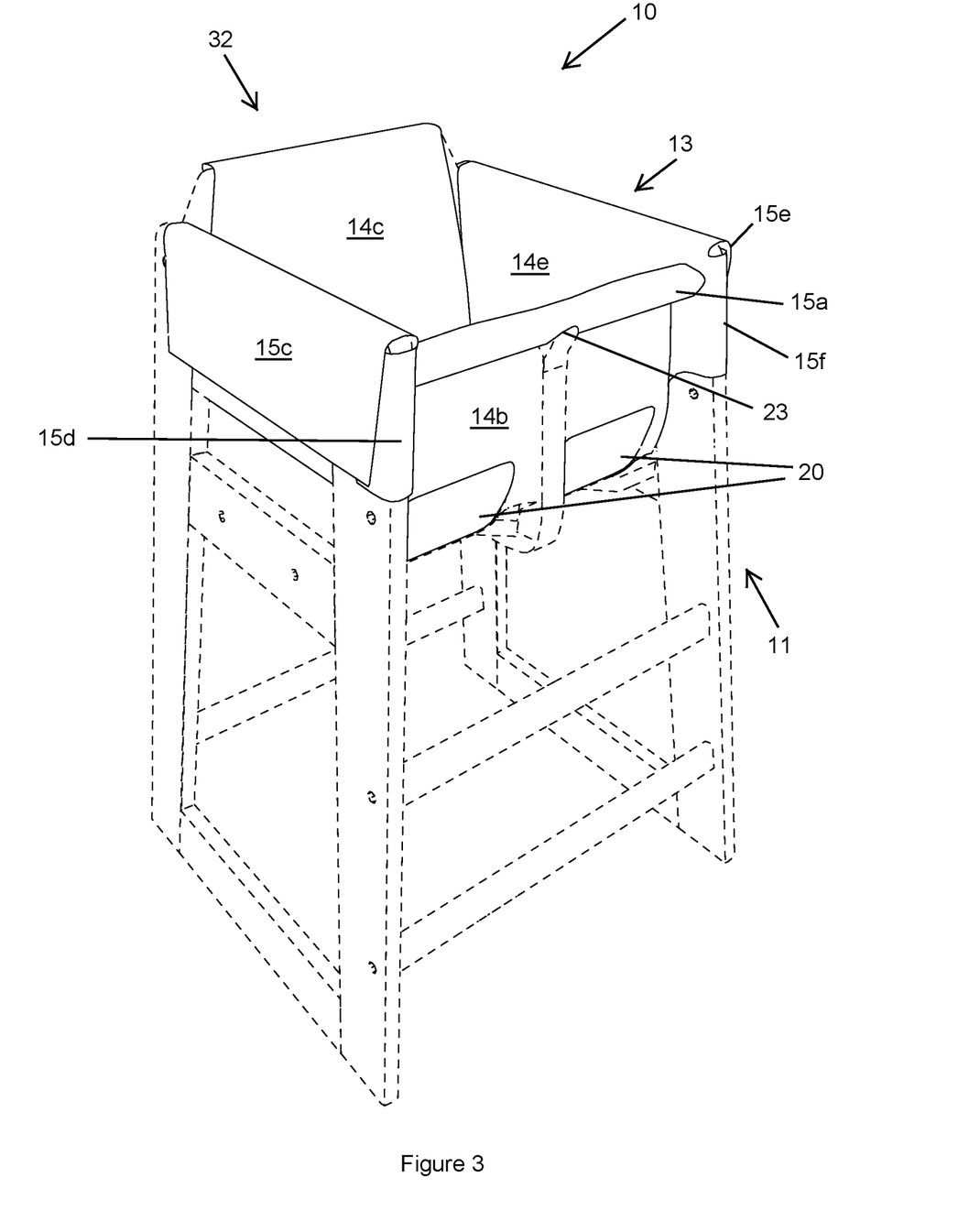
FIG. 3 is a perspective view illustrating a partially folded configuration (in-use configuration) of the baby high chair liner shown in FIG. 1, when positioned on an existing high chair, according to a non-limiting exemplary embodiment of the present disclosure.

In a non-limiting exemplary embodiment of the present disclosure, FIGS. 2-3 show perspective views of baby high chair liner 10 for baby high chairs 11 featuring the series of panels 14. More specifically, the series of panels 14 include a central panel 14a, a front panel 14b, a rear panel 14c, a right side panel 14d, and a left side panel 14e. Tape, VELCRO® or other suitable fasteners 17 are provided at the series of panels 14 for securing the foldable hygienic liner 10 over portions of the high chair including arms, back, and back and front safety bars. The foldable hygienic liner 10 features leg apertures 20 for receiving legs of a baby during use.

Figure 4:
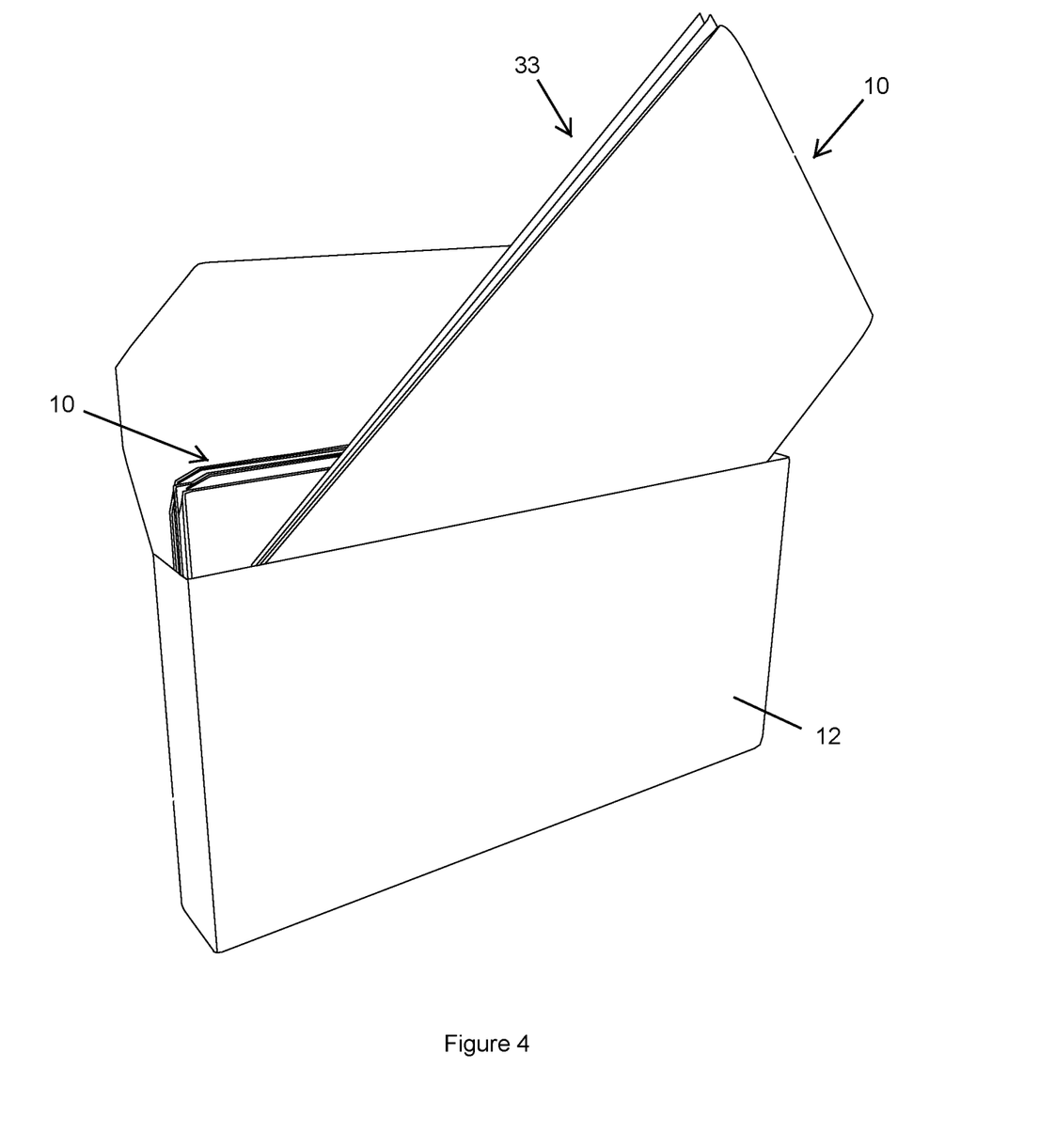
FIG. 4 is a perspective view illustrating a folded configuration (non-use, transport configuration) of the baby high chair liner shown in FIG. 1, when not positioned on an existing high chair, according to a non-limiting exemplary embodiment of the present disclosure.

In a non-limiting exemplary embodiment of the present disclosure, as shown in FIG. 4, a package (carrier) 12 for carrying new or refillable disposable high chair liner 10 may be included. The foldable hygienic liner 10 may be folded for portability, storage, and transport. The exact specifications, materials used, and method of use of the baby high chair liner 10 may vary upon manufacturing.

Referring to FIGS. 1-4 in general, baby high chair liner 10 is disclosed for use with an existing baby high chair 11. The baby high chair liner 10 includes a single and unitary body 13 having a centrally registered longitudinal axis 28 and a centrally registered latitudinal axis 29. Body 13 includes a plurality of panels 14 integrally and monolithically coupled to each other, a plurality of fold over tabs 15 integrally and monolithically coupled to the panels 14 respectively, a plurality of lines of weakness 16 disposed at associated conjoining edges of the panels 14 and the fold over tabs 15 such that the fold over tabs 15 are freely pivotally about the lines of weakness 16, respectively, and a plurality of fasteners 17 connected to the fold over panels 14, respectively. Advantageously, the fasteners 17 are configured to detachably secure the fold over panels 14 to the existing baby high chair 11. Advantageously, the panels 14 and the fold over tabs 15 are configured to secure and cover a major seat surface area of an existing baby high chair 11 and thereby provide a protective barrier between a child and the existing baby high chair 11. Advantageously, the single and unitary body 13 is configured to contour an inner portion of the existing baby high chair 11 when installed on the high chair. Advantageously, the panels 14 and the fold over tabs 15 each are flexible and include disposable material. Such a structural configuration yields the new, useful, and unpredicted result of effectively and succinctly covering and attaching body 13 to a high chair thereby solving the problem of undesirable and premature detachment of the body 13 from a variety of alternately shaped and sized high chairs.

In a non-limiting exemplary embodiment, the panels 14 include a central panel 14a, a front panel 14b flexibly and integrally attached to the central panel 14a, a rear panel 14c flexibly and integrally attached to the central panel 14a and oppositely seated from the front panel 14b wherein the rear panel 14c has a tapered shape converging away from the central panel 14a, a right side panel 14d flexibly and integrally attached to the central panel 14a wherein the right side panel 14d has a tapered shape diverging away from the central panel 14a, and a left side panel 14e flexibly and integrally attached to the central panel 14a and oppositely seated from the right side panel 14d wherein the left side panel 14e has a tapered shape diverging away from the central panel 14a. Such a structural configuration yields the new, useful, and unpredicted result of adapting the body 13 to accommodate a variety of different high chairs thereby solving the problem of not being able to cover substantially all the seat area of high chair 11.

In a non-limiting exemplary embodiment, the fold over tabs 15 includes a front fold over tab 15a flexibly and integrally attached to the front panel 14b wherein the front fold over tab 15a is bifurcated into a first fold over tab section 50 and a second fold over tab section 51 with gap 23 situated therebetween. The fold over tabs 15 further include a rear fold over tab 15b flexibly and integrally attached to the rear panel 14c, a right side fold over primary tab 15c flexibly and integrally attached to the right side panel 14d, a right side fold over auxiliary tab 15d flexibly and integrally attached to the right side panel 14d and registered at a right angle to the right side fold over primary tab 15c, a left side fold over primary tab 15e flexibly and integrally attached to the left side panel 14e, and a left side fold over auxiliary tab 15f flexibly and integrally attached to the left side panel 14e and registered at a right angle to the left side fold over primary tab 15e. Such a structural configuration yields the new, useful, and unpredicted result of enabling a user to securely attach the body 13 to a variety of alternately sized and shaped high chairs.

In a non-limiting exemplary embodiment, the left side fold over auxiliary tab 15f and the right side fold over auxiliary tab 15d each have a surface area less than an associated surface area of the left side fold over primary tab 15e and the right side fold over primary tab 15c, respectively. Such a structural configuration yields the new, useful, and unpredicted result of ensuring the body 13 is securely affixed to the front section of the high chair 11 so that body 13 does not disengage the covered surface area of the high chair 11.

In a non-limiting exemplary embodiment, the left side fold over auxiliary tab 15f and the right side fold over auxiliary tab 15d extend forwardly relative to the left side fold over primary tab 15e and the right side fold over primary tab 15c, respectively. Such a structural configuration yields the new, useful, and unpredicted result of ensuring the body 13 is securely affixed to the front section of the high chair 11 so that body 13 does not disengage the covered surface area of the high chair 11.

In a non-limiting exemplary embodiment, selected ones of the fold over tabs 15 are configured to secure the single and unitary body 13 to each of the arm portions, back portion, and front safety bars of the existing baby high chair 11. Such a structural configuration yields the new, useful, and unpredicted result of ensuring the body 13 is securely affixed to the front section of the high chair 11 so that body 13 does not disengage the covered surface area of the high chair 11.

In a non-limiting exemplary embodiment, the single and unitary body 13 further includes a plurality of apertures 18 juxtaposed side-by-side at the front panel 14b and are configured to removably receive infant legs therethrough while seated in the existing baby high chair 11. Such a structural configuration yields the new, useful, and unpredicted result of maintaining the body 13 at a substantially stable position even when the infant squirms and kicks while seated in the high chair 11.

In a non-limiting exemplary embodiment, the single and unitary body 13 is flexible and includes a unmorphed first shape 30 having an unfolded planar configuration (FIG. 1), a morphed second shape 31 having a partially unfolded configuration (FIG. 2), a morphed third shape 32 having a partially folded and in-use configuration to cover the existing baby high chair 11 (FIG. 3), and a morphed fourth shape 33 having a folded planar and non-use configuration to transport the baby high chair liner 10 (FIG. 4). Advantageously, the baby high chair liner 10 further includes a transport carrier 12 configured to received and house the single and unitary body 13 when folded to the morphed fourth shape 33. Such a structural configuration yields the new, useful, and unpredicted result of enabling a caregiver to adapt body 13 quickly and succinctly between a folded transport configuration, then to an unfolded configuration, then to a partially folded in-use configuration, as needed.

In a non-limiting exemplary embodiment, the fasteners 17 include at least one of a hook-and-loop fastener and an adhesive tape. Such a structural configuration yields the new, useful, and unpredicted result of enabling the caregiver to selectively adjust a tension and shape of body 13 to accommodate various high chairs.

The present disclosure further includes a method of using a baby high chair liner 10 with an existing baby high chair 11. Such a method includes the steps of: providing an existing baby high chair 11; and providing a baby high chair liner 10 having a single and unitary body 13. Such a baby high chair liner 10 has a plurality of panels 14 integrally and monolithically coupled to each other, a plurality of fold over tabs 15 integrally and monolithically coupled to the panels 14 respectively, a plurality of lines of weakness 16 disposed at associated conjoining edges of the panels 14 and the fold over tabs 15 such that the fold over tabs 15 are freely pivotally about the lines of weakness 16, respectively, and a plurality of fasteners 17 connected to the fold over panels 14, respectively, wherein the panels 14 and the fold over tabs 15 each are flexible and include disposable material. Such method steps yields the new, useful, and unpredicted result of effectively and succinctly covering and attaching to a high chair by solving the problem of undesirable and premature detachment of the body 13 from a variety of alternately shaped and sized high chairs.

The method further includes the steps of: the fasteners 17 detachably securing the fold over panels 14 to the existing baby high chair 11; the panels 14 and the fold over tabs 15 securing and covering a major seat surface area of an existing baby high chair 11 and thereby providing a protective barrier between a child and the existing baby high chair 11; and the single and unitary body 13 contouring an inner portion of the existing baby high chair 11 when installed on the high chair. Such method steps yields the new, useful, and unpredicted result of effectively and succinctly covering and attaching to a high chair by solving the problem of undesirable and premature detachment of the body 13 from a variety of alternately shaped and sized high chairs.

In a non-limiting exemplary embodiment of the present disclosure, the present disclosure advantageously overcomes the aforementioned deficiencies by providing a disposable, foldable product for lining a variety of baby high chairs. The present disclosure is superior to other products in that its structural configuration provides the new, useful, and unpredictable result of effectively protecting babies from germs found on high chairs.

In a non-limiting exemplary embodiment of the present disclosure, baby high chair liner 10 includes a series of panels 14 with fold over tabs 15 for securing to and covering a significant portion of the high chair 11 to provide a protective barrier between a child and the high chair 11. Tape 17 is included on the series of panels 14 for securing the foldable hygienic liner 10 over portions of the high chair 11 including arms, back, and safety rod. The foldable hygienic liner 10 features leg apertures 20 for receiving legs of a baby during use. The foldable hygienic liner 10 may be folded for portability, storage, and transport. A package (carrier) 12 may be included for carrying the liner 10 before or between uses. The foldable hygienic liner 10 provides a solution for covering public high chairs and protecting babies from germs.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents and shall not be restricted or limited by the above detailed description.

What is claimed as new and what is desired to secure by Letters Patent of the United States is:

1. A baby high chair liner for use with an existing baby high chair, said baby high chair liner comprising: a single and unitary body including
   a plurality of panels integrally and monolithically coupled to each other;
   a plurality of fold over tabs integrally and monolithically coupled to said panels respectively;
   a plurality of lines of weakness disposed at associated conjoining edges of said panels and said fold over tabs such that said fold over tabs are freely pivotally about said lines of weakness, respectively; and
   a plurality of fasteners connected to said fold over panels, respectively;
   wherein said fasteners are configured to detachably secure said fold over panels to the existing baby high chair;
   wherein said panels and said fold over tabs are configured to secure and cover a major seat surface area of an existing baby high chair and thereby provide a protective barrier between a child and the existing baby high chair;
   wherein said single and unitary body is configured to contour an inner portion of the existing baby high chair when installed on the high chair;
   wherein said panels include
      a central panel,
      a front panel flexibly and integrally attached to said central panel,
      a rear panel flexibly and integrally attached to said central panel and oppositely seated from said front panel, said rear panel having a tapered shape converging away from said central panel,
      a right side panel flexibly and integrally attached to said central panel, said right side panel having a tapered shape diverging away from said central panel, and
      a left side panel flexibly and integrally attached to said central panel and oppositely seated from said right side panel, said left side panel having a tapered shape diverging away from said central panel;
   wherein said fold over tabs include
      a front fold over tab flexibly and integrally attached to said front panel, said front fold over tab being bifurcated into a first fold over tab section and a second fold over tab section,
      a rear fold over tab flexibly and integrally attached to said rear panel,
      a right side fold over primary tab flexibly and integrally attached to said right side panel,
      a right side fold over auxiliary tab flexibly and integrally attached to said right side panel and registered at a right angle to said right side fold over primary tab,
      a left side fold over primary tab flexibly and integrally attached to said left side panel, and
      a left side fold over auxiliary tab flexibly and integrally attached to said left side panel and registered at a right angle to said left side fold over primary tab.

2. The baby high chair liner of claim 1, wherein said left side fold over auxiliary tab and said right side fold over auxiliary tab each have a surface area less than an associated surface area of said left side fold over primary tab and said right side fold over primary tab, respectively.

3. The baby high chair liner of claim 1, wherein said left side fold over auxiliary tab and said right side fold over auxiliary tab extend forwardly relative to said left side fold over primary tab and said right side fold over primary tab, respectively.

4. The baby high chair liner of claim 1, wherein selected ones of said fold over tabs are configured to secure said single and unitary body to arm portions, a back portion, and front safety bars of the existing baby high chair.

5. The baby high chair liner of claim 1, wherein said single and unitary body further includes a plurality of apertures juxtaposed side-by-side at said front panel and are configured to removably receive infant legs therethrough while seated in the existing baby high chair.

6. The baby high chair liner of claim 1, wherein said single and unitary body is flexible and comprises:
   a unmorphed first shape having an unfolded planar configuration;
   a morphed second shape having a partially unfolded configuration;
   a morphed third shape having a partially folded and in-use configuration to cover the existing baby high chair; and
   a morphed fourth shape having a folded planar and non-use configuration to transport said baby high chair liner;
   wherein said baby high chair liner further comprises a transport carrier configured to received and house said single and unitary body when folded to said morphed fourth shape.

7. The baby high chair liner of claim 1, wherein said fasteners comprise: at least one of a hook-and-loop fastener and an adhesive tape.

8. A baby high chair liner for use with an existing baby high chair, said baby high chair liner comprising: a single and unitary body including
   a plurality of panels integrally and monolithically coupled to each other;
   a plurality of fold over tabs integrally and monolithically coupled to said panels respectively;
   a plurality of lines of weakness disposed at associated conjoining edges of said panels and said fold over tabs such that said fold over tabs are freely pivotally about said lines of weakness, respectively; and a plurality of fasteners connected to said fold over panels, respectively;

wherein said fasteners are configured to detachably secure said fold over panels to the existing baby high chair;

wherein said panels and said fold over tabs are configured to secure and cover a major seat surface area of an existing baby high chair and thereby provide a protective barrier between a child and the existing baby high chair;

wherein said single and unitary body is configured to contour an inner portion of the existing baby high chair when installed on the high chair;

wherein said panels and said fold over tabs each are flexible and include disposable material;

wherein said panels include
a central panel,
a front panel flexibly and integrally attached to said central panel,
a rear panel flexibly and integrally attached to said central panel and oppositely seated from said front panel, said rear panel having a tapered shape converging away from said central panel,
a right side panel flexibly and integrally attached to said central panel, said right side panel having a tapered shape diverging away from said central panel, and
a left side panel flexibly and integrally attached to said central panel and oppositely seated from said right side panel, said left side panel having a tapered shape diverging away from said central panel;

wherein said fold over tabs include
a front fold over tab flexibly and integrally attached to said front panel, said front fold over tab being bifurcated into a first fold over tab section and a second fold over tab section,
a rear fold over tab flexibly and integrally attached to said rear panel,
a right side fold over primary tab flexibly and integrally attached to said right side panel,
a right side fold over auxiliary tab flexibly and integrally attached to said right side panel and registered at a right angle to said right side fold over primary tab,
a left side fold over primary tab flexibly and integrally attached to said left side panel, and
a left side fold over auxiliary tab flexibly and integrally attached to said left side panel and registered at a right angle to said left side fold over primary tab.

9. The baby high chair liner of claim 8, wherein said left side fold over auxiliary tab and said right side fold over auxiliary tab each have a surface area less than an associated surface area of said left side fold over primary tab and said right side fold over primary tab, respectively.

10. The baby high chair liner of claim 8, wherein said left side fold over auxiliary tab and said right side fold over auxiliary tab extend forwardly relative to said left side fold over primary tab and said right side fold over primary tab, respectively.

11. The baby high chair liner of claim 8, wherein selected ones of said fold over tabs are configured to secure said single and unitary body to arm portions, a back portion, and front safety bars of the existing baby high chair.

12. The baby high chair liner of claim 8, wherein said single and unitary body further includes a plurality of apertures juxtaposed side-by-side at said front panel and are configured to removably receive infant legs therethrough while seated in the existing baby high chair.

13. The baby high chair liner of claim 8, wherein said single and unitary body is flexible and comprises:
a unmorphed first shape having an unfolded planar configuration;
a morphed second shape having a partially unfolded configuration;
a morphed third shape having a partially folded and in-use configuration to cover the existing baby high chair; and
a morphed fourth shape having a folded planar and non-use configuration to transport said baby high chair liner;
wherein said baby high chair liner further comprises a transport carrier configured to received and house said single and unitary body when folded to said morphed fourth shape.

14. The baby high chair liner of claim 8, wherein said fasteners comprise: at least one of a hook-and-loop fastener and an adhesive tape.

15. A method of using a baby high chair liner with an existing baby high chair, said method comprising the steps of:
providing an existing baby high chair;
providing a baby high chair liner including a single and unitary body having a plurality of panels integrally and monolithically coupled to each other, a plurality of fold over tabs integrally and monolithically coupled to said panels respectively, a plurality of lines of weakness disposed at associated conjoining edges of said panels and said fold over tabs such that said fold over tabs are freely pivotally about said lines of weakness, respectively, a plurality of fasteners connected to said fold over panels, respectively, and said panels and said fold over tabs each are flexible and include disposable material;
said fasteners detachably securing said fold over panels to the existing baby high chair;
said panels and said fold over tabs securing and covering a major seat surface area of an existing baby high chair and thereby providing a protective barrier between a child and the existing baby high chair; and
said single and unitary body contouring an inner portion of the existing baby high chair when installed on the high chair;

wherein said panels include
a central panel,
a front panel flexibly and integrally attached to said central panel,
a rear panel flexibly and integrally attached to said central panel and oppositely seated from said front panel, said rear panel having a tapered shape converging away from said central panel,
a right side panel flexibly and integrally attached to said central panel, said right side panel having a tapered shape diverging away from said central panel, and
a left side panel flexibly and integrally attached to said central panel and oppositely seated from said right side panel, said left side panel having a tapered shape diverging away from said central panel;

wherein said fold over tabs include
a front fold over tab flexibly and integrally attached to said front panel, said front fold over tab being bifurcated into a first fold over tab section and a second fold over tab section,
a rear fold over tab flexibly and integrally attached to said rear panel,
a right side fold over primary tab flexibly and integrally attached to said right side panel, a right side fold over auxiliary tab flexibly and integrally attached to said right side panel and registered at a right angle to said right side fold over primary tab, a left side fold over primary tab flexibly and integrally attached to said left side panel, and a left side fold over auxiliary tab flexibly and integrally attached to said left side panel and registered at a right angle to said left side fold over primary tab.

* * * * *